Figure 1:
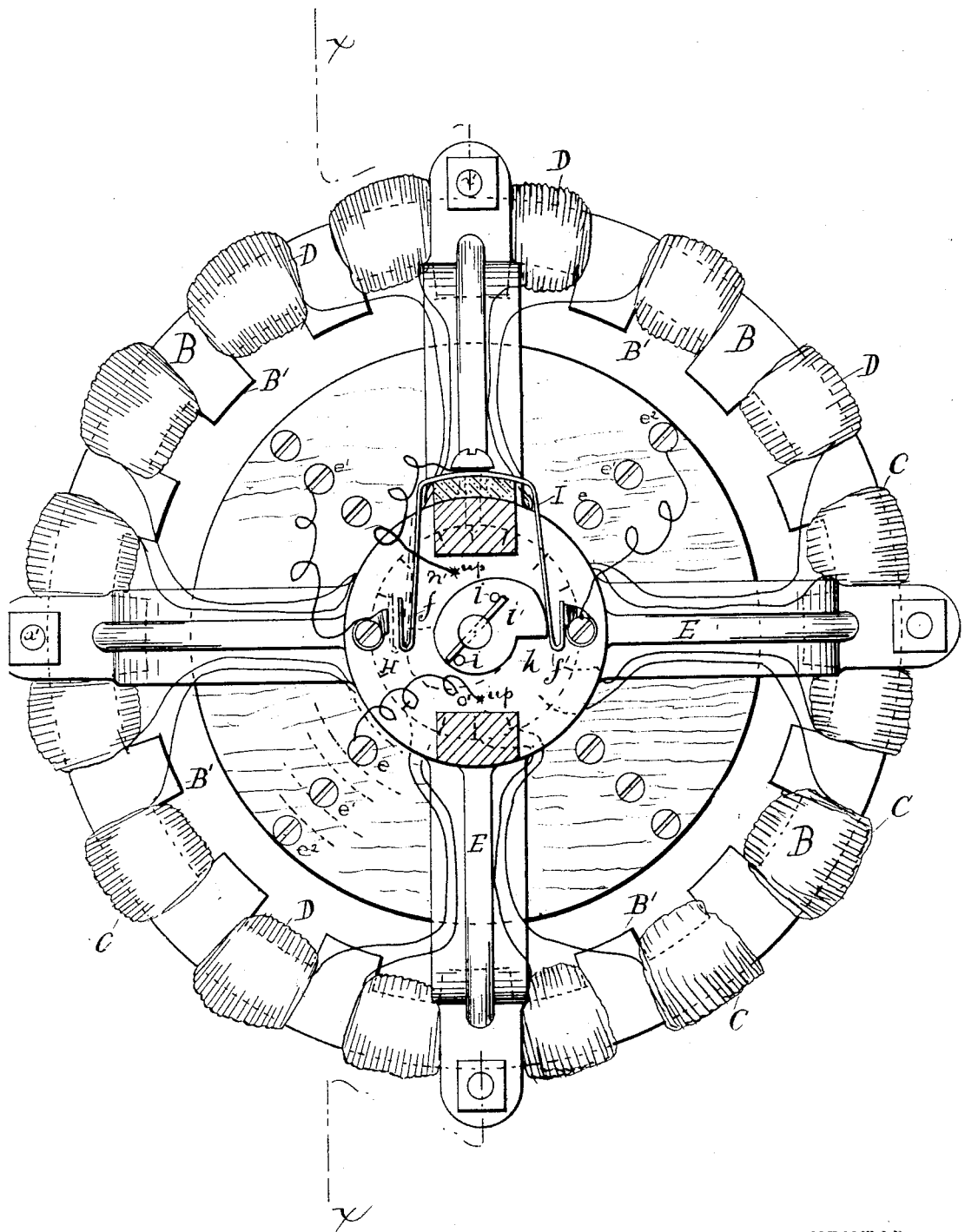

(No Model.) 5 Sheets—Sheet 1.

O. F. CONKLIN.
ELECTRIC MOTOR.

No. 516,263. Patented Mar. 13, 1894.

WITNESSES:

INVENTOR.
Oliver F. Conklin
BY
Toulmin & McCarty
HIS ATTORNEYS.

(No Model.) 5 Sheets—Sheet 2.

O. F. CONKLIN.
ELECTRIC MOTOR.

No. 516,263. Patented Mar. 13, 1894.

WITNESSES:
H. M. Plaisted.
Warren M. McNair.

INVENTOR.
Oliver F. Conklin
By
Toulmin & McCarty
HIS ATTORNEYS.

(No Model.) 5 Sheets—Sheet 4.

O. F. CONKLIN.
ELECTRIC MOTOR.

No. 516,263. Patented Mar. 13, 1894.

WITNESSES:
H. M. Plaisted
Warren M. McNair

INVENTOR.
Oliver F. Conklin
BY
Toulmin & McCarty
HIS ATTORNEYS

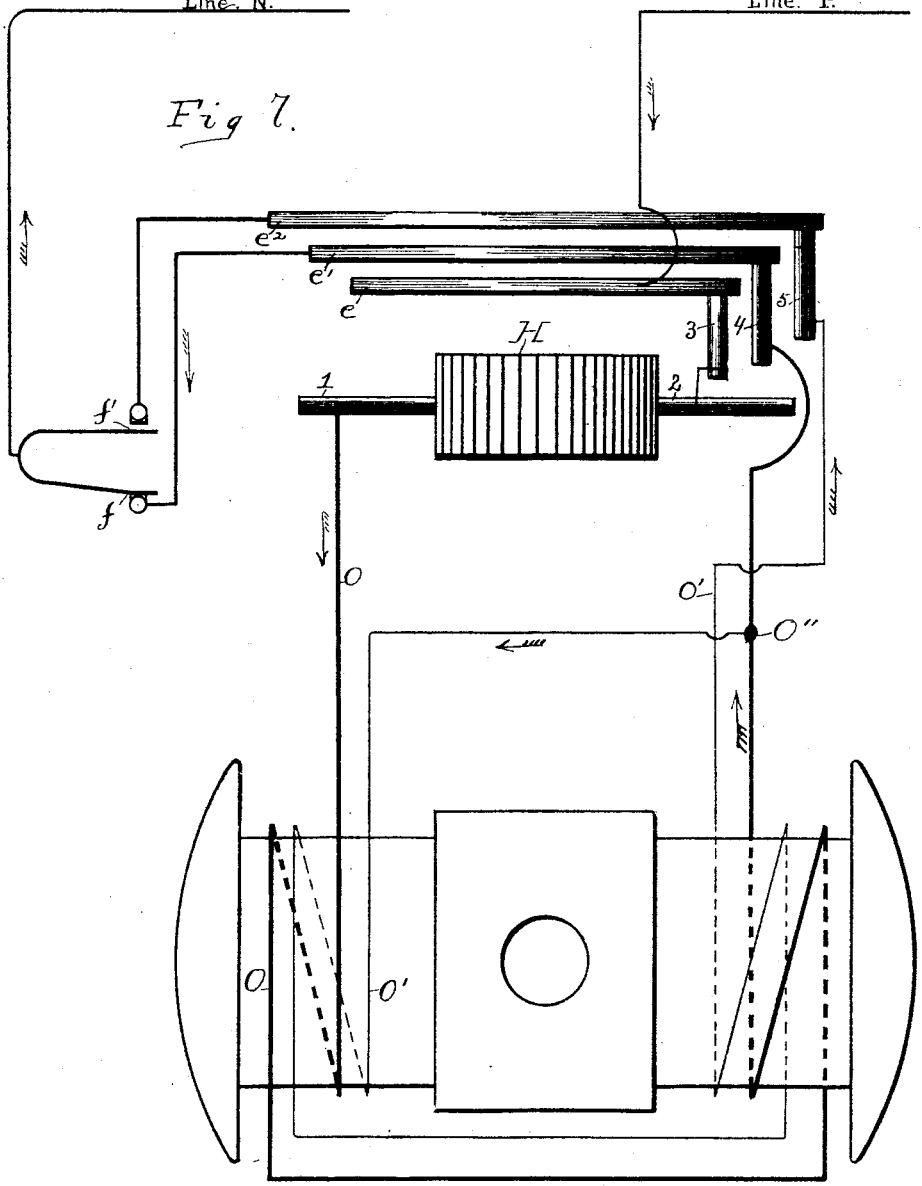

UNITED STATES PATENT OFFICE.

OLIVER F. CONKLIN, OF DAYTON, OHIO, ASSIGNOR TO THE DAYTON FAN AND MOTOR COMPANY, OF SAME PLACE.

ELECTRIC MOTOR.

SPECIFICATION forming part of Letters Patent No. 516,263, dated March 13, 1894.

Application filed January 9, 1893. Serial No. 457,788. (No model.)

*To all whom it may concern:*

Be it known that I, OLIVER F. CONKLIN, of Dayton, county of Montgomery, State of Ohio, have invented a new and useful Improvement in Electric Motors, of which the following is a specification.

My invention relates to certain new and useful improvements in electric motors of the class designed for rotary ceiling fans; the improvements have reference to means for controlling and regulating the speed of the motor, and to other points that will be described in the specification and pointed out in the claims.

For a detailed description of my improvements attention is called to the accompanying drawings which are hereby made a part of the specification, and upon which like reference characters denote corresponding parts in the several views.

Figure 2:
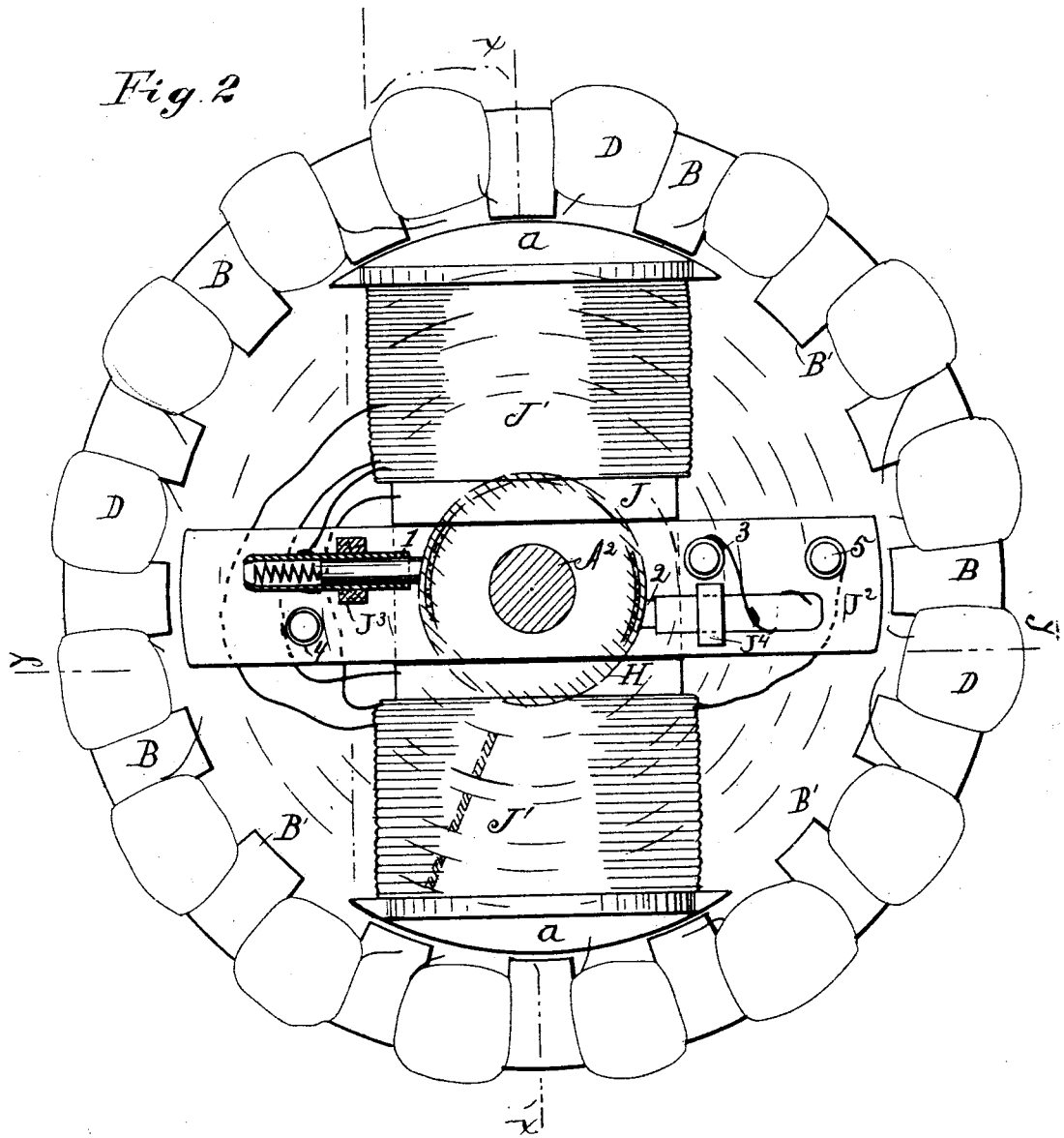
Figure 3:
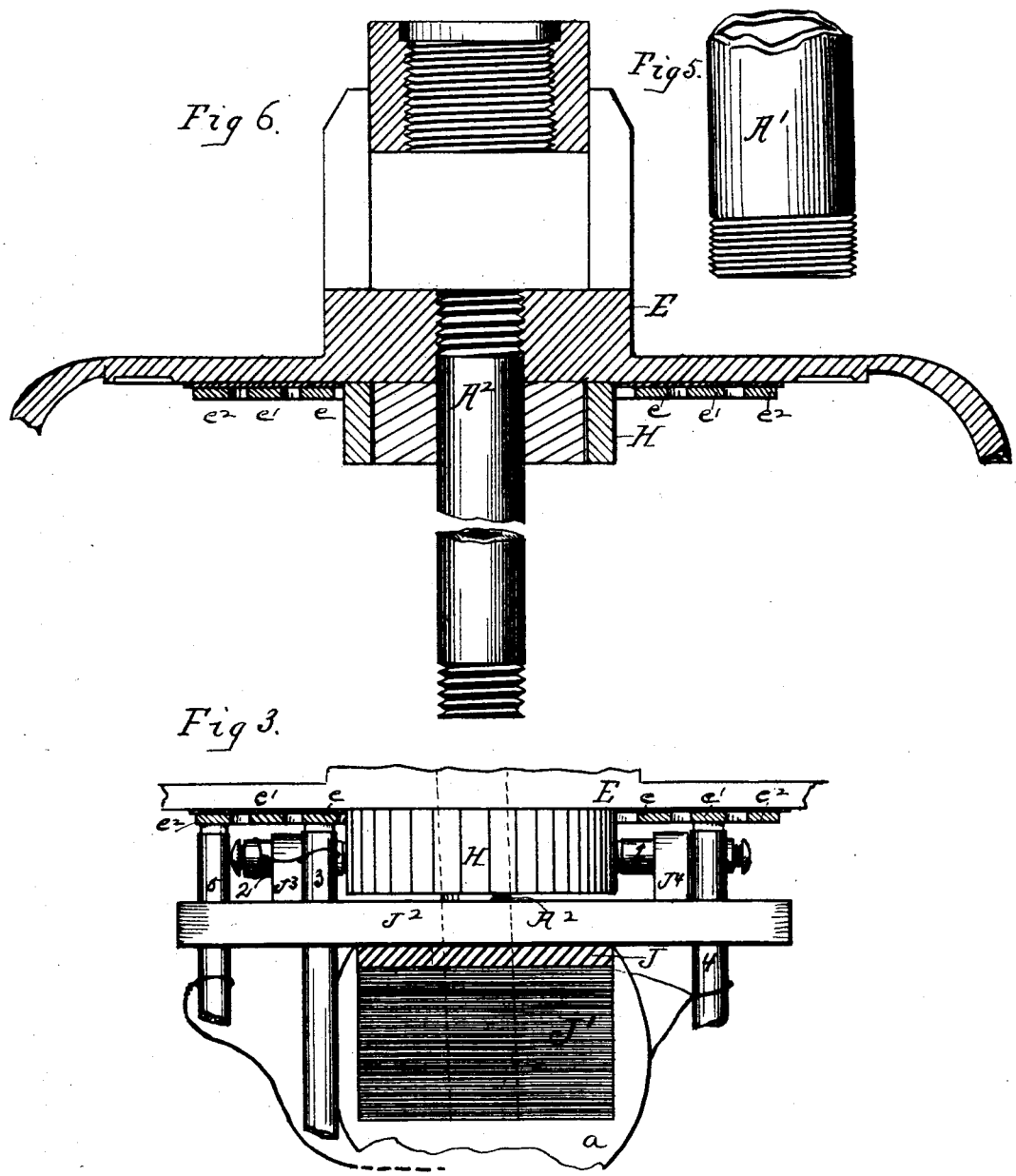
Figure 4:
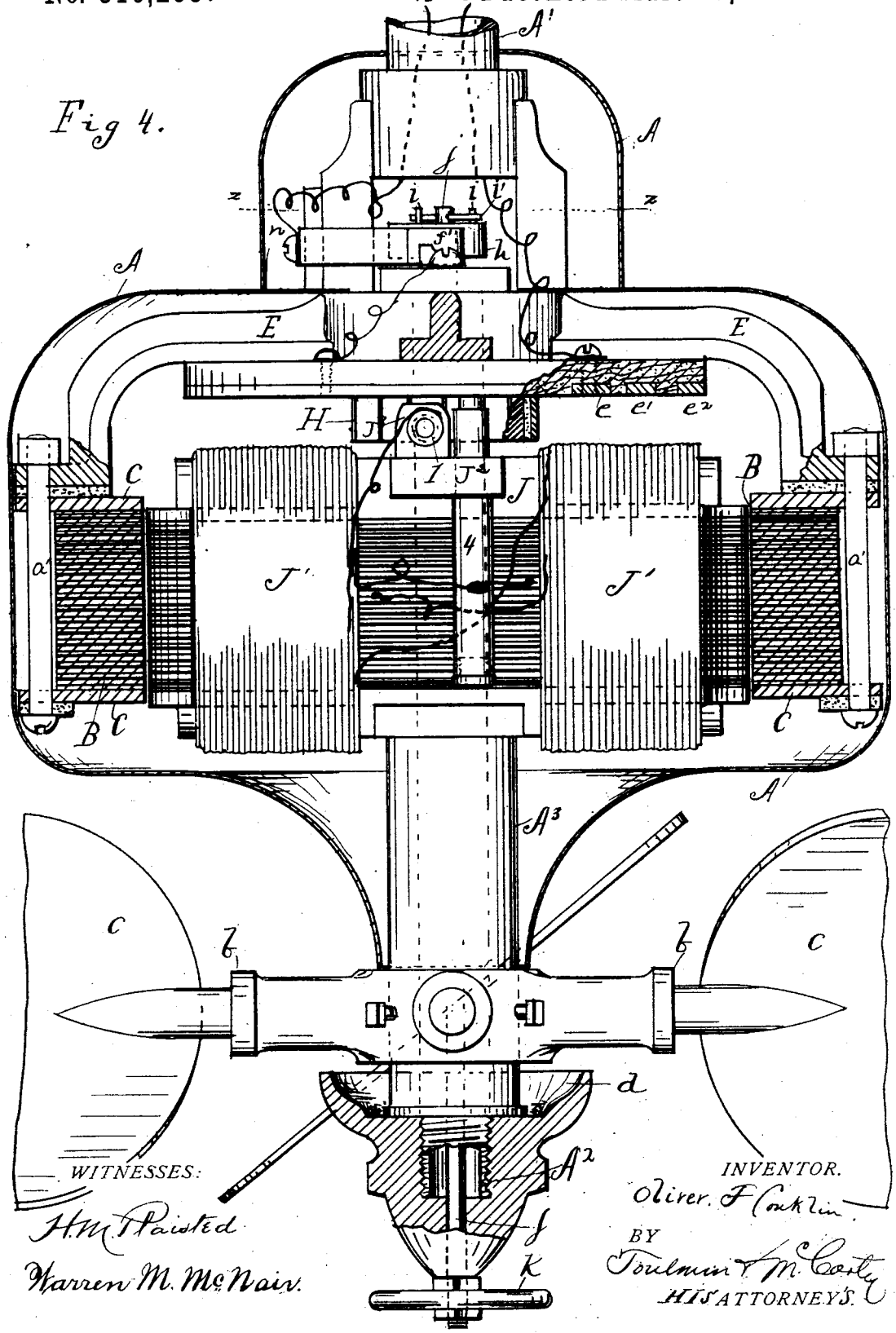

Figure 1 is a plan view on the line $z-z$ of Fig. 4, showing the wires connecting the armature coils with the commutator, the latter appearing in broken lines; Fig. 2 a plan view from beneath, the lower portion of the shaft $A^2$ and the fans detached; Fig. 3 a cross section on the lines $y-y$ of Fig. 2. Fig. 4 is a vertical section of the motor. Fig. 5 is a detached, detail view of the lower end of the ceiling shaft, a part broken off; Fig. 6 a cross section through the commutator, collector rings and upper portion of the spider. Fig. 7 is a diagram of the circuits.

A is the inclosing shell of spun brass which is, together with the motor, supported by the shaft A′ depending from the ceiling. The lower terminal of the shell terminates adjacent to the fan blade sockets so that the motor is entirely inclosed within said shell.

$A^2$ is a hollow stationary shaft upon which the field magnet runs and is supported; the upper end of this shaft is screwed into the arch of the spider as appears in Fig. 5, while its lower portion is inclosed by the bronze sleeve $A^3$ which is fixed to the field magnet, and supports the fan blade sockets.

B indicates a stationary armature consisting of a continuous ring of alternate layers of disks of sheet iron and paper of the required depth, and has for its outside rings, cast iron plates C. The interior of the armature is provided with a series of alternately arranged pole pieces B′ which have the effect of reducing the magnetic resistance of the air gap between the armature and the field. Between these pole pieces the coils D of the armature are wound, the core and pole pieces being in one piece; and said armature is attached to the cast iron spider E by a suitable number of bolts $a'-a'$. The spider is attached to the lower end of the shaft A′ by a screw-threaded engagement (see Fig. 6) and thus are the motor and fans depended.

J is the field magnet constructed of laminated iron and paper interlaid alternately and held together by iron plates $a$, conforming to the contour of the field, and is fixed as before stated, to the bronze sleeve $A^3$ which sleeve forms a bearing for the fan blade sockets $b$, carrying the fans $c$. The lower end of said sleeve is in bearing with the drip cup $d$ which has a screw-threaded engagement with the stationary shaft A′. In the lower face of the spider E and fixed thereto, are the commutator H, and a set of collector rings $e\ e'\ e^2$ for conveying current into the revolving field; these rings appear in broken lines in Fig. 2, and in section in Figs. 3 and 6.

1, 2, 3, 4 and 5 indicate brushes provided with the usual holders and springs and mounted in sockets in a cast iron plate $J^2$ having uprights $J^3$ and $J^4$, attached rigidly to the field magnet and which is provided with a central opening through which the shaft $A^2$ passes, see Fig. 2. Two of the brushes, 1 and 2, contact directly with the commutator; brush 3 makes contact with the inside collector ring $e$, carrying current to brush 2 and thence to the commutator. Brushes 4 and 5 contact with the rings $e'$ and $e^2$ connected to the points $f$ and $f'$ of the switch I, see Fig. 1, and to the ends of the field magnet coils J′ J′ of which there are two sets, an inside and outside coil.

Fig. 3 shows the contact made by the respective brushes. $h$ is a cam provided with pins $i\ i$ and loosely mounted on the upper end of rod $j$, which rod extends longitudinally through the shaft A′ and has at its lower extremity a thumb knob $k$ by means of which said rod is turned. Fixed transversely to the upper end of this rod is a pin $i'$ adapted to engage with one or the other of the pins $i\ i$ on the cam $h$, thereby causing said cam to effect a connection with one or the other point $ff'$ of the switch, thus the current may be supplied through one or both sets of field magnet coils. The switch is constructed of spring metal, therefore, the resiliency of said metal facilitates the movement of the cam after said cam has been slightly moved from either of the points $ff'$, causing it to snap to the opposite point.

The course of the circuit is illustrated in the diagram, Fig. 7; in this diagram the contact $f$ is closed which is the case when only one of the field-magnet coils is excited. O and O' represent the inner and outer coils. O'' represents the junction of the outside end of coil O and the inside end of coil O' with the line to collector ring $e'$ through brush 4. Current enters through wire P to collector ring $e$, thence through brushes 3 and 2 to the commutator H from whence it traverses brush 1 which has connection with inside coil O; through said coil current passes to brush 4 which contacts with collector ring $e'$, from said collector ring current passes to switch contact $f$ and out *via* line N.

Having described my invention, I desire to claim—

1. In an electric motor, the combination with a stationary armature with inwardly projecting pole pieces, the armature core and pole pieces being of one piece; a revolving field magnet having two sets of coils, inclosed within said armature; a commutator and a series of collector rings; of a spider to which the armature is attached, said spider provided with a vertical extension with a space therein; a switch attached to said extension within said space, and the points of said switch having connections with the coils on the field-magnet; a cam by which said points are moved to effect said connections, and means for operating said cam, as herein described.

2. In an electric motor, the combination with the armature; of a spider upon which said armature is supported, said spider having a space in the central vertical extension thereof; a switch attached to said extension within said space, said switch having two contact points; a field-magnet having two sets of coils, inclosed by the armature; a vertical rod and a cam loosely mounted thereon, whereby connection may be effected with one or both sets of field-magnet coils, substantially as described.

3. In an electric motor, the combination of a switch consisting of a metallic spring substantially of U-shape; a spider provided with a vertical extension with a space therein in which said switch is placed; a series of collector rings connected to contact points and to the field-magnet coils; a vertical rod with a transverse pin fixed thereto; a cam with pins $i, i$, loosely mounted on said rod, by means of which the points of the switch may be magnetically connected with one or both sets of coils on the field-magnet, as herein described.

In testimony whereof I have hereunto set my hand this 20th day of December, 1892.

OLIVER F. CONKLIN.

Witnesses:
R. JAY McCARTY,
WALTER F. PHELPS.